Figure 1:
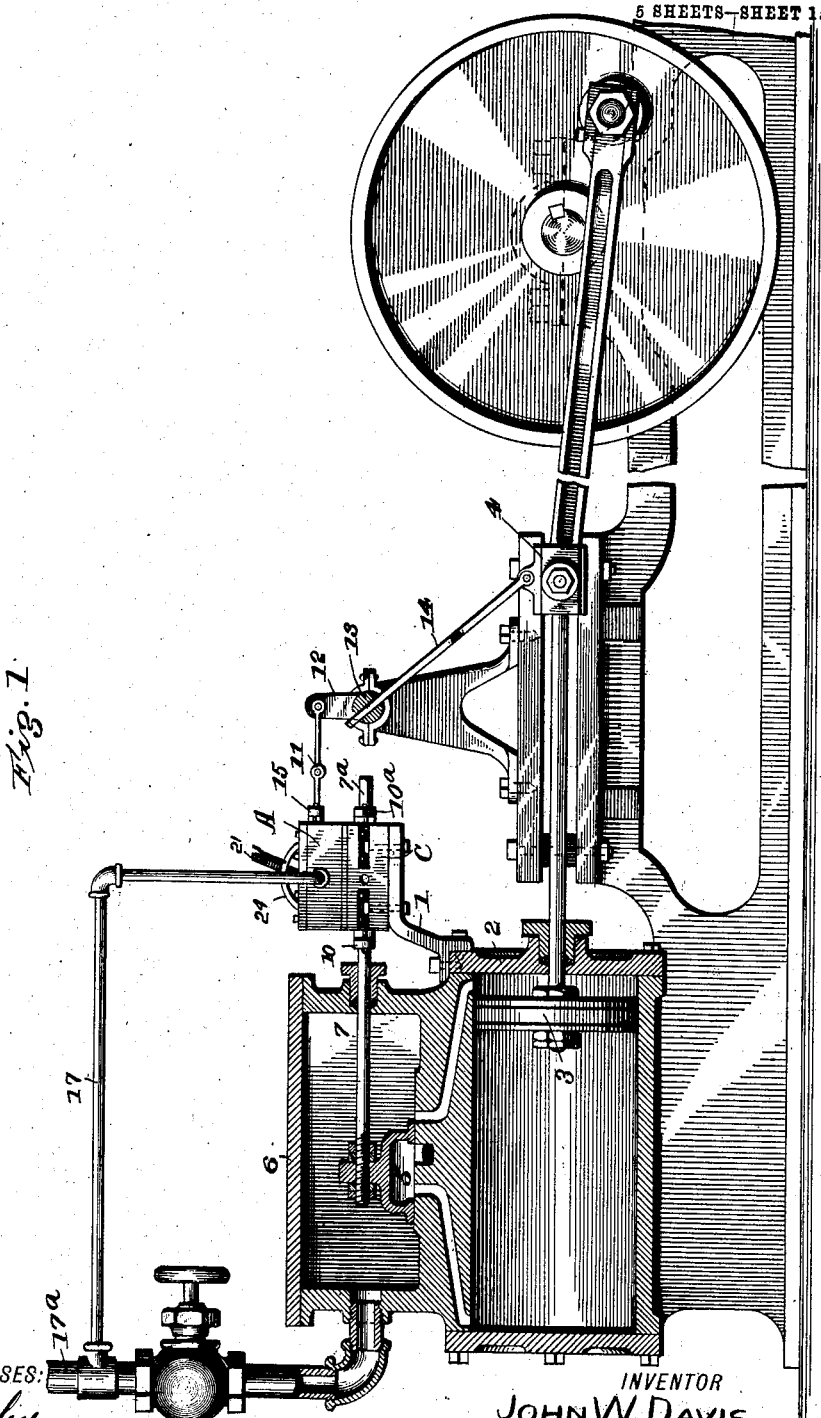

No. 827,428. PATENTED JULY 31, 1906.
J. W. DAVIS.
VALVE GEAR FOR STEAM ENGINES.
APPLICATION FILED SEPT. 19, 1905.

5 SHEETS—SHEET 1.

WITNESSES:

INVENTOR
John W. Davis
BY
ATTORNEYS

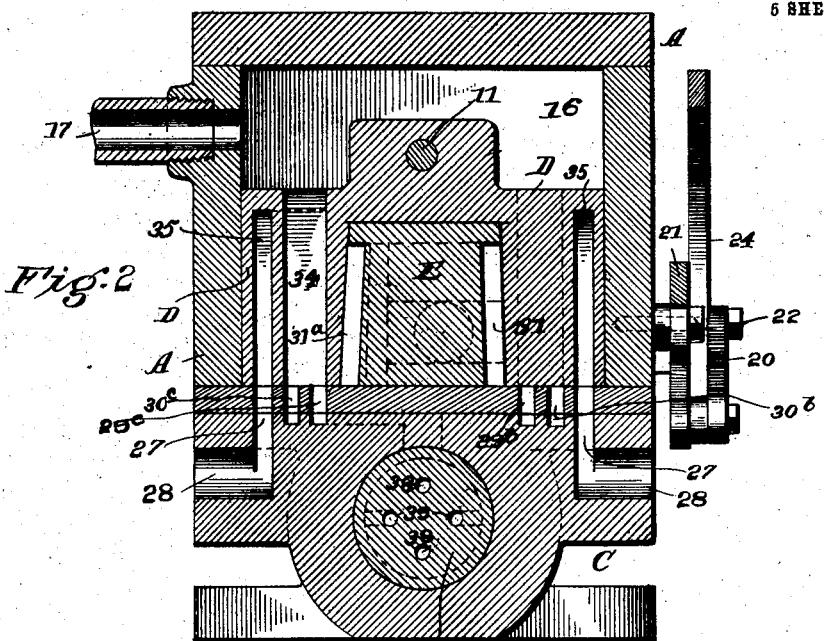

No. 827,428. PATENTED JULY 31, 1906.
J. W. DAVIS.
VALVE GEAR FOR STEAM ENGINES.
APPLICATION FILED SEPT. 19, 1905.
5 SHEETS—SHEET 3.
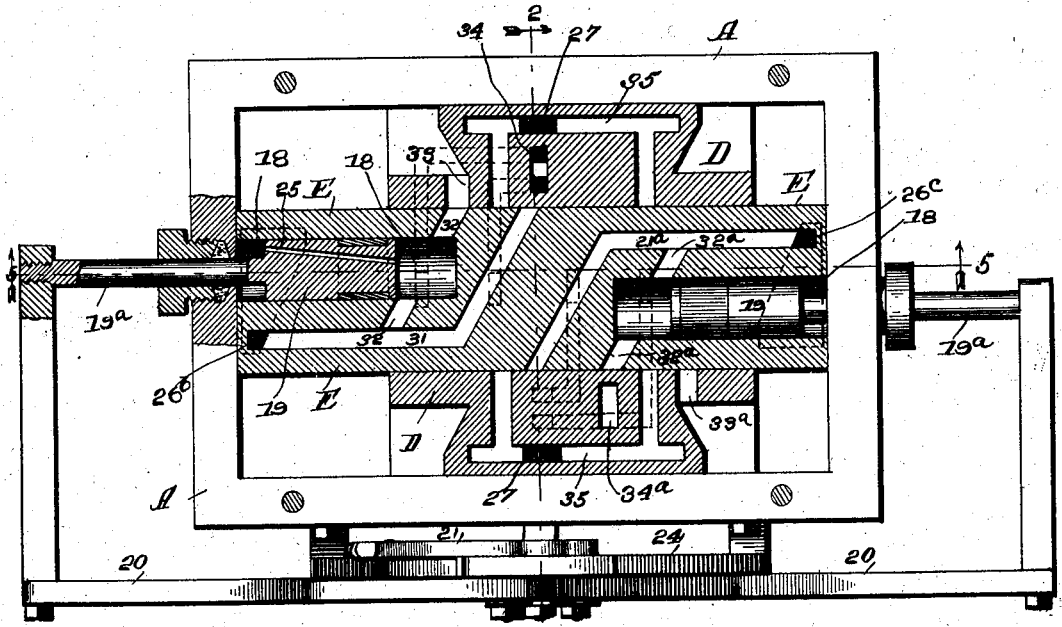
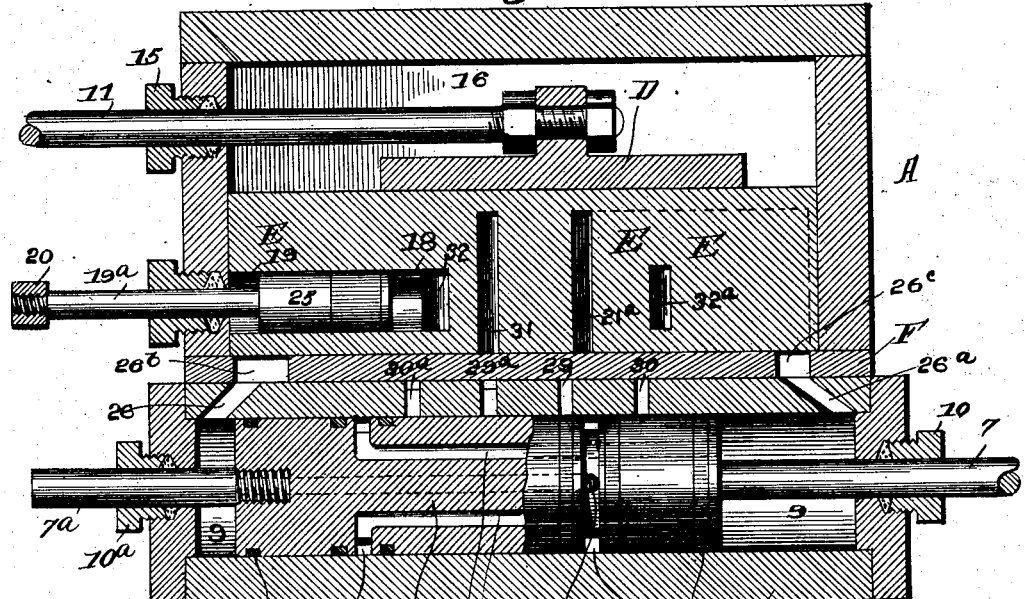
WITNESSES:
INVENTOR
JOHN W. DAVIS
BY
ATTORNEYS No. 827,428.   PATENTED JULY 31, 1906.
J. W. DAVIS.
VALVE GEAR FOR STEAM ENGINES.
APPLICATION FILED SEPT. 19, 1905.
5 SHEETS—SHEET 4.
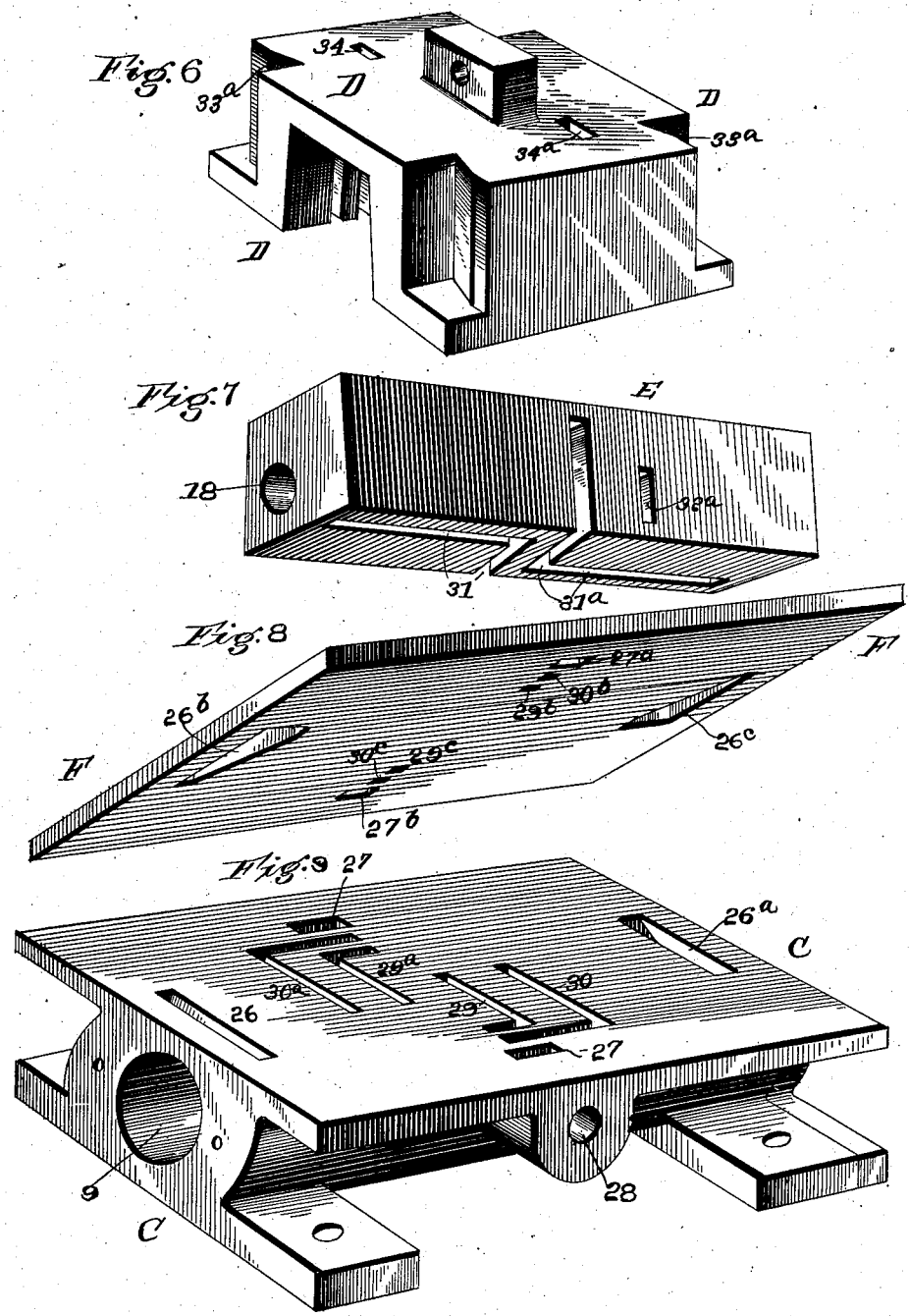
WITNESSES:
INVENTOR
JOHN W. DAVIS
BY
ATTORNEYS No. 827,428. PATENTED JULY 31, 1906.
J. W. DAVIS.
VALVE GEAR FOR STEAM ENGINES.
APPLICATION FILED SEPT. 19, 1905.
5 SHEETS—SHEET 5.
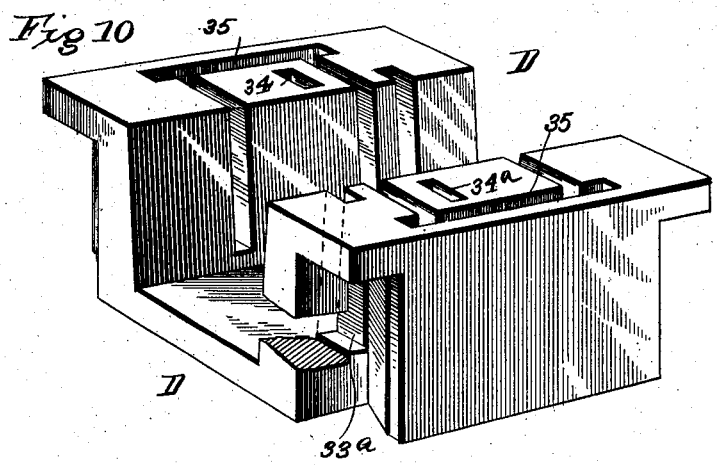
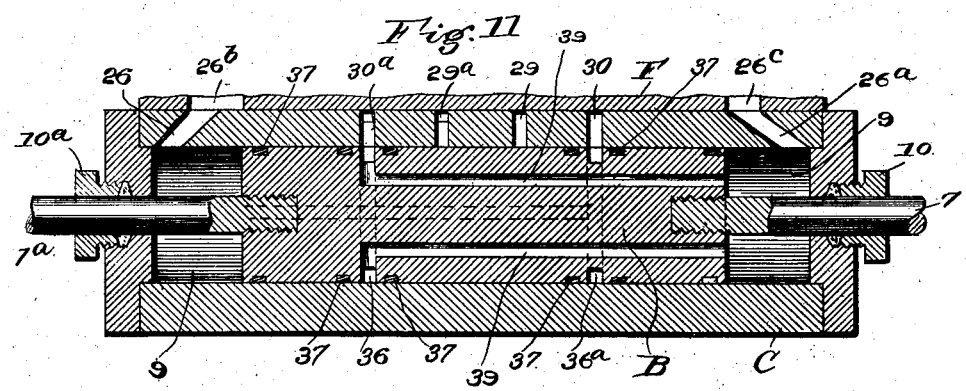
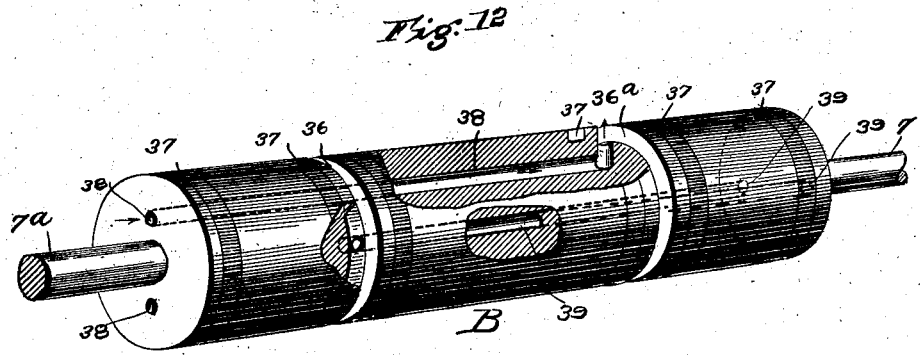
WITNESSES:
INVENTOR
John W. Davis
BY
ATTORNEYS

UNITED STATES PATENT OFFICE.

JOHN W. DAVIS, OF OLNEY, ILLINOIS, ASSIGNOR OF ONE-FOURTH TO JOHN W. TENNYSON AND ONE-FOURTH TO FRANCIS M. DUNBAR, BOTH OF OLNEY, ILLINOIS.

VALVE-GEAR FOR STEAM-ENGINES.

No. 827,428.           Specification of Letters Patent.           Patented July 31, 1906.

Application filed September 19, 1905. Serial No. 279,069.

*To all whom it may concern:*

Be it known that I, JOHN W. DAVIS, a citizen of the United States, and a resident of Olney, in the county of Richland and State of Illinois, have invented a new and Improved Valve-Gear and Cut-Off for Steam-Engines, of which the following is a full, clear, and exact description.

My invention is an improved means for effecting instant movement of the slide or other regulating valve of an engine, it being adapted to cut off at full stroke, if desired, and the usual eccentric cam or cam-rod and other valve-gear being dispensed with.

The details of construction, arrangement, and operation are hereinafter described and claimed, the same being illustrated in the accompanying drawings, in which—

Figure 1 is in part a vertical section and in part an elevation of a steam-engine with my improvement attached. Fig. 2 is a vertical cross-section on the line 2 2 of Fig. 4. Fig. 3 is a side elevation of the attachment. Fig. 4 is a horizontal section of the attachment. Fig. 5 is a central vertical longitudinal section of the main portions of the attachment, the same being mainly on the line 5 5 of Fig. 4. Fig. 6 is a perspective view of a slide-valve forming a part of the attachment. Fig. 7 is a perspective view of the ported block to which the aforesaid slide-valve is applied and on which it reciprocates. Fig. 8 is a supplemental plate adapted to be secured upon the bed-plate of the attachment. Fig. 9 is a perspective view of the bed-plate or base of the attachment. Fig. 10 is a perspective view of the valve shown in Fig. 6, the same being inverted. Fig. 11 is a longitudinal section of the auxiliary piston or piston-valve employed while shifting the slide-valve of the engine, together with a cylinder in which the same works; and Fig. 12 is a perspective view of the said auxiliary piston, or piston-valve, a portion being broken off to show one of the steam-ports.

Referring in the first instance to Fig. 1, A indicates the box or casing in which the operative parts of my attachment are inclosed, the same being supported upon a lateral bracket 1, bolted to the head of the engine-cylinder 2. A piston 3 is arranged in said cylinder and connected by a rod with a cross-head 4, working in guides and connected with the crank of the shaft in a well-known manner. An ordinary D slide-valve 5 is arranged in the steam-chest 6 to govern the admission and exhaust of steam to and from the cylinder 2. This valve 5 is connected by the rod 7 with the auxiliary piston or piston-valve B, which is arranged in a suitable bore 9 in the bed or foundation C of my improved attachment. The said rod 7 slides in a stuffing-box 10, forming an attachment of the box or casing A, and a guide-rod 7$^a$ is attached to the other end of the auxiliary piston, (see Figs. 5, 11, and 12,) the same working in a corresponding stuffing-box 10$^a$. This rod 7$^a$ serves simply as a guide-rod.

In the upper portion of the box or casing A is arranged the saddle-valve D, (see Figs. 6 and 10,) the same being fitted and adapted to slide upon a part E (see Figs. 2, 4, 5, and 7) in the casing A, which is a rectangular oblong block provided with ports. The valve D is connected by a jointed rod 11 (see Fig. 1) with a crank 12 of a rock-shaft 13, which is operatively connected by rods 14 with the aforesaid cross-head 4, so that the shaft is rocked and the valve reciprocated corresponding to the reciprocatory travel of the cross-head. The aforesaid rod 11 works in a stuffing-box 15. Steam is admitted to the valve-chamber 16 by pipe 17, connecting with the main steam-pipe 17$^a$ of the engine. The auxiliary cylindrical piston B, (see Figs. 5 and 12,) which is adapted to travel in the bore 9 of the bed C, Fig. 9, as before stated, is reciprocated and cushioned by steam admitted through ports in the bed C, and being rigidly connected with the D-valve 5 of the steam-engine it is obvious that the latter will be reciprocated accordingly. In other words, the movement of the auxiliary piston B regulates the movement of the engine-valve, and thereby governs the latter. The auxiliary piston is in turn governed in its movements by the saddle slide-valve D, which governs admission of steam to and exhaust of same from ports in the ported or chambered block E. The said block (see Figs. 4 and 5) is provided with end bores 18, in which pistons 19 are adapted to slide, the same being connected by rods 19$^a$ with right-angular levers 20, whose inner ends are pivotally connected with a hand-lever 21, that is pivoted on the side of the casing A. (See especially Fig. 3.) It will be noted that the levers are attached on opposite sides of the pivot 22 of said lever, so that by the throw of the latter the levers will move the pistons 19 toward each other or apart accordingly, and by this movement certain ports are opened or closed, as will be hereinafter described. The lever 21 is provided with a spring-pawl 23, by which it may be locked in either of two positions with the quadrant 24, attached to the side of the casing A. The cut-off pistons 19 have longitudinal passages 25, (see Fig. 4,) which allow free passage of steam from one end to the other, so that it is prevented from forming a cushion at either end which might prevent due movement of the pistons.

The auxiliary piston B is moved in either direction by pressure of steam applied between its ends and the adjacent heads of the bore 9 (see especially Fig. 5) where the piston is ready to move to the right upon the admission of steam from the left-hand port 26. This port is indicated in Fig. 9 as located close to the end of the bed C, and a corresponding inlet-port 26$^a$ is located at the other end. Exhaust-ports 27 are arranged on opposite sides and at the center of the length of the bed-plate C, and they communicate with the lateral passages 28. Two L-shaped ports are arranged in pairs on opposite sides of the central portion of the bed-plate C, those on one side being indicated by numbers 29 and 30 and the corresponding ones on the opposite side by numerals 29$^a$ and 30$^a$. All these ports communicate at their inner ends with the bore 9, in which the auxiliary piston B reciprocates, and the same are indicated in Fig. 5. The ports or passages 29 29$^a$ are for full-stroke cushions, and 30 30$^a$ may be termed "cut-off" cushion-ports. Upon the foundation C is applied a plate F, (see Fig. 8,) the same being arranged between the upper portion of the casing A, and thus forming the bed upon which the block E directly rests, as indicated in Figs. 2 and 5. This plate has openings 26$^b$ 26$^c$ at its respective ends, the same corresponding and being adapted to register with the steam-ports 26 and 26$^a$ of the foundation C. Further, it has on one side ports 29$^b$ and 30$^b$, adapted to register with the ports 29 30 in foundation C, and on the opposite side it has similar ports 29$^c$ and 30$^c$, adapted to register with the ports 29$^a$ and 30$^a$ of the foundation C. As before intimated, the base or bottom of the block E (see Figs. 5 and 7) rests upon the plate F. This pipe is provided with two long obtuse-angled ports 31 and 31$^a$ (see Fig. 4) and also side ports 32 and 32$^a$, communicating with the respective ports 31 31$^a$, connected with or traversing the piston-bores 18.

The saddle-valve D, which slides on the block E, is provided with ports as follows: As indicated in Figs. 4 and 10, two live-steam ports 33 and 33$^a$ are provided at diagonally opposite points, also live-steam ports 34 and 34$^a$ at points intermediate the ends, but not directly opposite each other. (See Fig. 6.) The valve is further provided with exhaust-ports 35, the same extending along the sides of the valve, having two side passages, as shown in Figs. 4 and 10. The auxiliary piston B is provided at a point between its middle and each of its ends with circumferential grooves 36 36$^a$, (see Figs. 5 and 12,) and on each side of said grooves and also at the ends of the piston packing 37 is suitably arranged. A groove 36$^a$ communicates by longitudinal ports 38 with one end of the valve, and the other groove 36 communicates by grooves 39 with the opposite end of the same. The function of these ports 38 39 is to effect the cushioning of the piston or valve B, as will be presently explained. When lever 21 is thrown to the left and locked, as shown in Fig. 3, the cut-off pistons 19 (see Fig. 4) are thrown back, so that steam may enter either of the side ports which may be in communication with the said ports 32 or 32$^a$ of the block E. In Figs. 4 and 5 the saddle-valve D is in such a position that the mouths of the long ports 31 31$^a$ are closed, and its port 32 is in coincidence with the live-steam port 33 of the valve. Thus steam may pass from 33 through 32 and 18 into the long port 31, thence down through the port 26$^b$ in bed-plate F, and through end port 26 of bed C into the bore 9, in which the auxiliary piston B is located. (See Fig. 5.) In consequence the auxiliary piston B is forced to travel to the right. At the same time steam enters the vertical port 34 in saddle-valve D, and thus passes through ports 29$^b$ and 30$^b$ in plate F, also the cut-off and full-stroke ports 29 and 30 in bed C, (see Figs. 8, 9, and 5;) but steam is held captive or prevented from entering either groove 36 or 36$^a$ in the piston B, since neither of the grooves is at first in register with the ports 29, 30, &c. When piston B moves far enough to the right to spring the left groove 36 into register with port 30$^a$ in the bed C, steam passes through ports 39 in the piston B to the right-hand end of the same, and thus cushions and arrests it at half-stroke. Since the piston B is connected by the stem-guide with the slide-valve 5 of the engine, (see Fig. 1,) it is manifest that the valve 5 will have the same movement as the piston, and since the latter is arrested at half-stroke the piston 5 will take such position as to govern the ports of the cylinder 2, so that during the remainder of the travel of the piston 32 steam will work expansively. When the valve D completes its movement to the right, its port 33 will be coincident with the long port 31 of the block E and also with the full-stroke cushion-port 29$^b$ in plate F and the port 29 in bed C, (the coincident cut-off cushion-ports 30$^b$ and 30 in parts F C being shut off or closed at this juncture,) and so when the auxiliary piston B has been driven to the limit of its travel a cushion-port therein will coincide with the full-cushion port 29 in bed C, and thus steam will pass to the farther end of the bore 9 in the bed C, so as to cushion and stop the piston B. When the saddle-valve D reaches a point where its elongated side ports 35 coincide with the ports 27ª 27ᵇ in plate F and the corresponding ports 27 in bed C, steam will exhaust from both ends of the piston-cylinder at the same time. When the lever 21 is thrown to the opposite angle from that indicated in Fig. 3, the cut-off pistons 19 will be forced inward or toward each other, and thus close the ports 32 and 32ª in block E, so that steam cannot enter, and hence the valve D will pass on without moving the auxiliary piston B at this time; but when the valve C has completed its full travel its side port 33 will coincide with the mouth of the long full-stroke port 31 and also full-stroke cushion-port 29, so that steam will enter the latter, but be held captive therein, since the auxiliary piston B will be then in such position that its grooves will be out of register with any of the ports 29, &c.; but at the same time steam passes from the port 33 in valve D through the long port, and thus down through the end port 26 in the bed C, so that the piston B is driven its full travel. It will be understood, however, that a cushion-port in the piston B will be brought into due coincidence with a port in the bed and allow steam to pass to the end of the piston B in time to cushion and stop its travel at the right moment. When the piston B is thus actuated, the engine-valve 5 being moved correspondingly, the engine makes a full stroke without working steam expansively.

Having thus described my invention, what I claim is—

1. The combination with an engine-cylinder, a piston reciprocating therein and a slide-valve governing ports for admission and exhaust of steam, of an auxiliary piston connected with such valve, a casing having a cylinder in which said piston reciprocates, the latter having circumferential grooves and ports extending therethrough in opposite directions at the ends of the piston for admission and exhaust of steam at the ends of the piston-cylinder, a block arranged centrally in the casing and provided with end bores and short and long ports arranged as described, cut-off pistons arranged in the bores of said pipe, means for adjusting them for opening and closing said ports, and a saddle-valve applied to and adapted to slide upon the aforesaid block and having live-steam ports at diagonally opposite points which are adapted to register with the ports of the block and vertical ports arranged on opposite sides of the valve and between the middle and ends of the same and means connecting said valve with the piston of the engine, whereby the valve is actuated, substantially as described.

2. The combination with an engine-cylinder, a piston reciprocating therein and a slide-valve governing admission of steam by an auxiliary piston connected with the engine-valve and having cushioning-ports extending from its ends to points in the side thereof, a cylinder in which the piston reciprocates, the same having ports for admission of steam at the ends and intermediately thereof, and also exhaust-ports arranged as described, a plate arranged on the bed and provided with coincident end ports and intermediate ports, a central block arranged upon the said plate and having communicating long and short ports and a saddle-valve operatively connected with the engine-piston and having live-steam ports arranged diagonally opposite and vertical ports adapted to register with cushioning ports in the aforesaid plate, substantially as described.

3. In a cut-off-valve mechanism, the combination with an engine-valve, of a casing having a base provided with a longitudinal bore or cylinder, an auxiliary piston adapted to slide therein and provided with longitudinal ports for passage of steam and for cushioning, suitable ports for admitting steam to the ends of the piston-cylinder and intermediate thereof, a central block having ports connected with others in the bed, and a saddle-valve operatively connected with the engine and arranged slidably on the said pipe and having ports communicating with others in the block and the bed, substantially as described.

4. In a cut-off-valve mechanism, the combination with a central block having ports for communicating with other ports in the bed, of a saddle-valve adapted to slide on said block and having diagonally opposite ports adapted to be brought into and out of register with ports in the block, substantially as described.

JOHN W. × DAVIS.
his mark

Witnesses:
MILTON A. HAUSER.
WILLIAM PAFF.